April 7, 1942.   G. E. STOCKHAM   2,278,953
DISHWASHER AND IMPELLER THEREFOR
Filed May 11, 1939   2 Sheets-Sheet 1
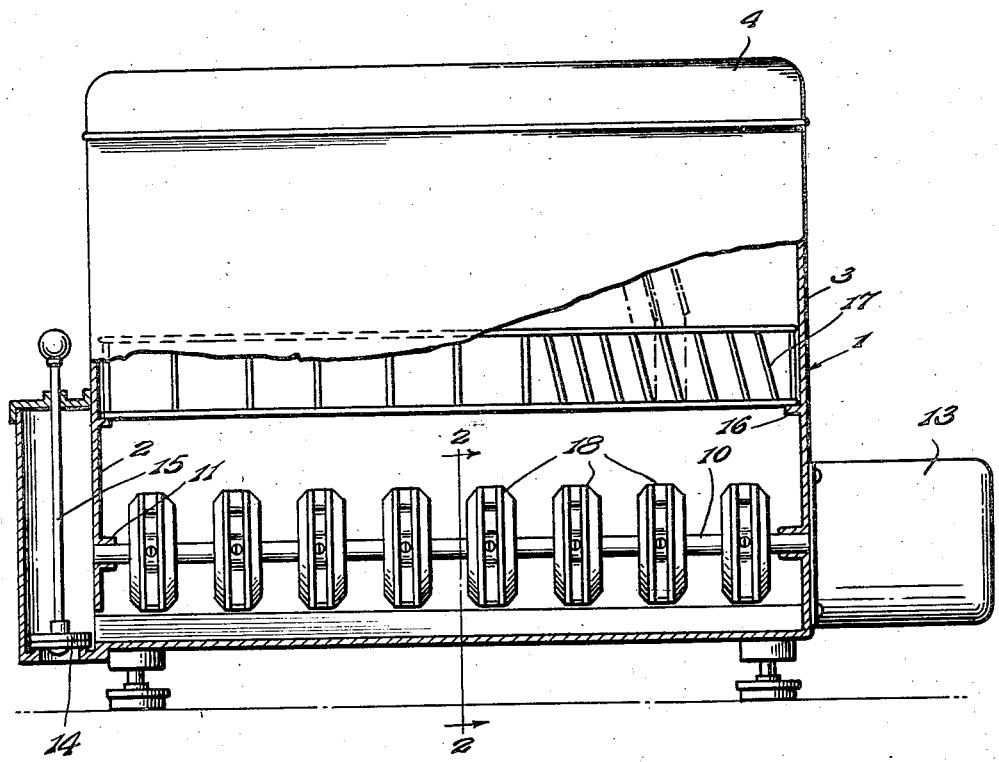
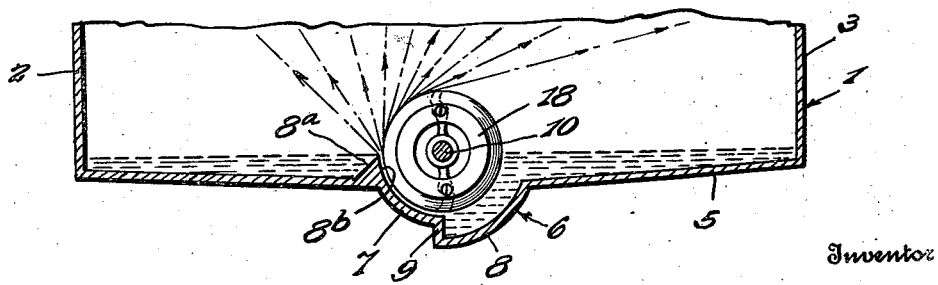
Inventor
G. E. Stockham.
By Lacey & Lacey, Attorneys

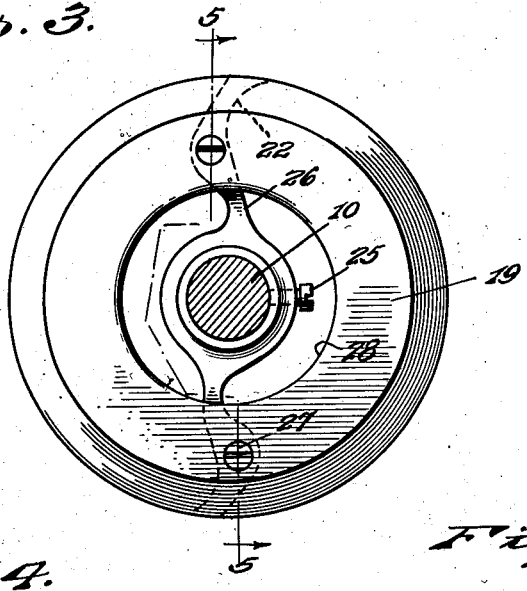
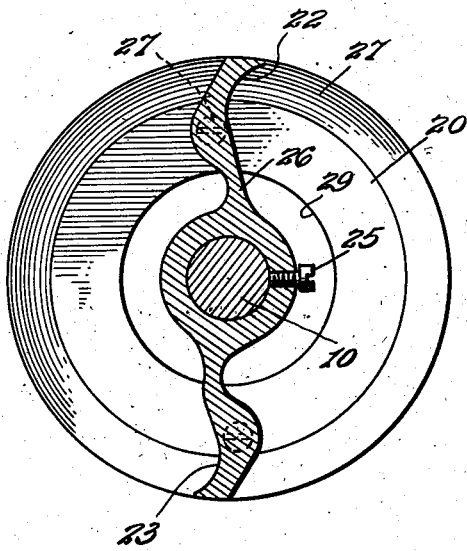
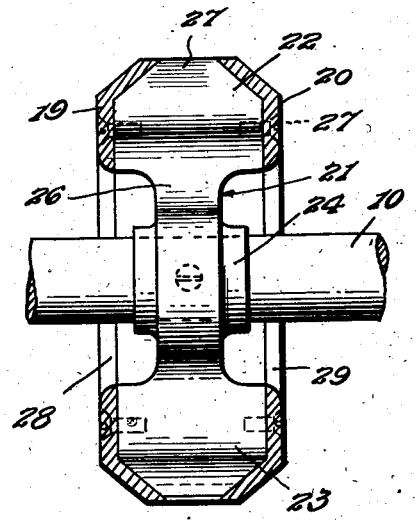

Patented Apr. 7, 1942

2,278,953

UNITED STATES PATENT OFFICE 2,278,953

DISHWASHER AND IMPELLER THEREFOR

Gordon E. Stockham, Piqua, Ohio

Application May 11, 1939, Serial No. 273,101

2 Claims. (Cl. 299—63)

This invention relates to an improved dish washer and impeller therefor.

One object of the invention is to provide a dish washer impeller which will project streams of water at various tangents within the dish washer housing so that highly efficient dish washing operation will be assured.

Another object of the invention is to provide a dish washer wherein the impeller comprises a pair of concave disks having a blade confined therebetween, said disks and blade defining an axial opening and a radial discharge opening, the axial opening being larger than the discharge opening so that liquid will be discharged in concentrated streams tangentially with respect to the periphery of the impeller.

A further object of the invention is to provide a dish washer impeller which will eliminate splash.

As a further object, the invention seeks to provide a dish washer having a body which is formed with an improved trough which will include a shoulder for retaining water beneath the impeller until it has reached the position for projection at the proper tangent.

Another object of the invention is to provide a dish washer wherein the trough will tend to retain food particles and keep them out of circulation within the dish washer body.

And as a still further object, the invention seeks to provide a dish washer, the impeller of which will not vibrate when in use.

And another object is to provide a dish washer which is simple in construction and easy to operate.

Other and incidental objects of the invention will appear as the description proceeds.

In the drawings forming a part of my application,

Figure 1 is a sectional view, partly in elevation, of my improved dish washer.

Figure 2 is a transverse sectional view on the line 2—2 of Figure 1,

Figure 3 is a side elevation, enlarged, showing the impeller,

Figure 4 is an enlarged vertical sectional view of the impeller, and

Figure 5 is a sectional view on the line 5—5 of Figure 3.

Referring now more particularly to the accompanying drawings, wherein like reference numerals designate like parts throughout the various views, the numeral 1 indicates in general the body of my improved dish washer. The body 1 has side walls 2 and 3, a removable top wall, or lid, 4, and a bottom wall 5, which is inclined from its outer extremities toward its inner confronting ends.

Formed integral with the bottom wall 5 is an impeller trough, shown generally at 6. The impeller trough extends throughout the entire width of the body 1 and comprises a relatively shallow arcuate section 7 and a relatively deep arcuate section 8. The sections 7 and 8 are connected by a vertical portion which defines a shoulder 9. The arcuate sections 7 and 8 are swung on the same axis. However, as will be obvious, the radius of the arcuate section 7 is less than that of the section 8. A projecting shoulder 8ᵃ is mounted on the wall 5 adjacent the upper edge of the section 7. The shoulder 8ᵃ is, as shown, substantially triangular in cross section. The shoulder 8ᵃ has an arcuate face 8ᵇ.

Mounted in the body 1 is an impeller shaft 10. The shaft 10 is supported by bearings 11 and 12, of any suitable construction. As will be seen in Figure 2 of the drawings, the shaft 10 is mounted axially above the trough 6. The shaft 10 extends through the side wall 3 and is connected with a motor 13, which is secured to the outer surface of the wall 3 near its lower end.

Located at the opposite side of the body 1 from the motor 13, on the side wall 2, is an outlet valve casing, having an outlet valve opening and a valve 14 therein. An actuating rod 15 is connected with the valve 14 and projects above the casing 12 for manual engagement.

Brackets 16 are mounted in the body 1, above the shaft 10, and support dish racks 17, of any approved construction.

Mounted on the impeller shaft 10 are impellers 18. Although I have shown eight impellers on the shaft 10, it should be understood that any desired number, up to the capacity of the shaft, may be used.

The impellers 18 are of identical construction, so that a description of one will suffice for both. A typical impeller 18 is shown in detail in Figures 3, 4 and 5 of the drawings. Said impeller 18 includes concave disks 19 and 20 which are connected by an impeller blade 21. The blade 21 includes blade sections 22 and 23, and an apertured hub 24. The hub 24 receives the shaft 10 therethrough. A set screw 25 is passed through the hub 24 and secures the impeller on the shaft 10. By referring to Figure 5 of the drawings, it will be seen that the blade sections 22 and 23 are relatively wide and that the webs 26, which connect said sections with the hub, are relatively narrow.

The disks 19 and 20 are connected with the blade 21 by screws 27 so that a rigid unitary construction for the impeller will be assured. The concave disks 19 and 20 cooperate with each other to define a relatively narrow circular discharge slot or opening 27, and the disks, furthermore, are provided with cut-away central portions which define relatively large inlet openings 28 and 29 at opposite sides of the impeller. As best seen in Figure 4 of the drawings, the blade sections 22 and 23 are curved alternately forwardly and rearwardly for more effectively scooping water therebeneath.

Attention is particularly called to the fact that, as the size of the opening 27 increases, the degree of curvature of the sections 22 and 23 increases, and conversely, as the size of the opening decreases, the curvature of the blades decrease. Any desired number of blades may be used, although it has been found that two blades operate in a highly satisfactory manner.

It will be understood that, as the discharge opening 27 is of less magnitude than the openings 28 and 29, water will be taken into the impeller at a greater rate than it can be discharged. The result will be that the water will leave the high pressure sides of the impeller sections, that is, the front faces of said impeller sections, under high pressure and tangentially thereto, as shown in dotted lines in Figure 2 of the drawings. The tangentially disposed streams will be concentrated, however, and will thus assure thorough cleansing of dishes in the body.

It is desired to call attention to the fact that the impeller will not splash when in use. Moreover, as the opening 27 is relatively small, danger of injury to materials dropped about the impeller will be greatly lessened.

The shoulder 8 will, as stated in the objects of the invention, retain food particles, and will prevent them from circulating further in the body. The shoulder 9, of course, aids materially in causing the water to be projected in tangential streams.

It is thought that further description of the invention is unnecessary.

Having thus described the invention, what is claimed as new is:

1. In a dish washer, a rotatable impeller including a pair of disks concave in section, a blade, and means connecting the disks to the blade, said blade having a hub and curved blade sections adapted for projecting streams of liquid tangentially with respect to the impeller upon rotation thereof.

2. In a dish washer as recited in claim 1, wherein the hub is provided with means for detachably securing the impeller to an impeller shaft.

GORDON E. STOCKHAM.